US012738793B2

(12) United States Patent
Naito et al.

(10) Patent No.: US 12,738,793 B2
(45) Date of Patent: Sep. 15, 2026

(54) STATOR ASSY, BRUSHLESS MOTOR, AND METHOD FOR MANUFACTURING STATOR ASSY

(71) Applicant: Murata Manufacturing Co., Ltd., Nagaokakyo (JP)

(72) Inventors: Osamu Naito, Nagaokakyo (JP); Miyuki Furuya, Hamamatsu (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 250 days.

(21) Appl. No.: 18/161,369

(22) Filed: Jan. 30, 2023

(65) Prior Publication Data

US 2023/0216366 A1 Jul. 6, 2023

Related U.S. Application Data

(63) Continuation of application No. PCT/JP2021/024718, filed on Jun. 30, 2021.

(30) Foreign Application Priority Data

Oct. 1, 2020 (JP) ................................ 2020-166696

(51) Int. Cl.
*H02K 5/08* (2006.01)
*H02K 1/12* (2006.01)
*H02K 15/12* (2006.01)

(52) U.S. Cl.
CPC ................ *H02K 5/08* (2013.01); *H02K 1/12* (2013.01); *H02K 15/12* (2013.01)

(58) Field of Classification Search
CPC .......... H02K 15/12; H02K 5/08; H02K 1/185; H02K 3/522; H02K 1/12; H02K 5/1675; H02K 5/24; H02K 5/00; H02K 5/02; H02K 15/14
USPC ........................................................ 310/89
See application file for complete search history.

(56) References Cited

U.S. PATENT DOCUMENTS

2007/0145842 A1* 6/2007 Zhu ...................... F04D 29/582 310/43
2013/0272904 A1 10/2013 Hozumi et al.
2016/0211717 A1* 7/2016 Honda ............... F04D 13/0693
(Continued)

FOREIGN PATENT DOCUMENTS

CN 210629230 U 5/2020
JP 2014087104 A 5/2014
JP 2014225944 A * 12/2014
(Continued)

OTHER PUBLICATIONS

Yamazaki et al, Stator Unit, Motor and Blower, Apr. 2, 2020, JP 2020054174 (English Machine Translation) (Year: 2020).*
(Continued)

*Primary Examiner* — Alexander A Singh
(74) *Attorney, Agent, or Firm* — ArentFox Schiff LLP

(57) ABSTRACT

A brushless motor is provided that includes a stator assy and a rotor. The stator assy includes a stator, a housing that has a space where the stator is disposed, and an insulating resin disposed in the space. The insulating resin fixes the housing to the stator. The housing includes a first housing member and a second housing member. The insulating resin also fixes first housing member to the second housing member.

15 Claims, 4 Drawing Sheets

(56) References Cited

U.S. PATENT DOCUMENTS

| | | | | |
|---|---|---|---|---|
| 2017/0141662 | A1 | 5/2017 | Nishidate | |
| 2023/0114545 | A1 * | 4/2023 | Higashiyama | F04D 29/5853 310/58 |

FOREIGN PATENT DOCUMENTS

| | | | | |
|---|---|---|---|---|
| JP | 2016197966 | A | | 11/2016 |
| JP | 2017099075 | A | | 6/2017 |
| JP | 2017099255 | A | | 6/2017 |
| JP | 2020054174 | A | * | 4/2020 |

OTHER PUBLICATIONS

Saeki et al, Motor, Dec. 4, 2014, JP 2014225944 (English Machine Translation) (Year: 2014).*

International Search Report in PCT/JP2021/024718, mailed Sep. 7, 2021, 3 pages.

* cited by examiner

STATOR ASSY, BRUSHLESS MOTOR, AND METHOD FOR MANUFACTURING STATOR ASSY

CROSS REFERENCE TO RELATED APPLICATIONS

This application is a continuation of PCT Application No. PCT/JP2021/024718, filed Jun. 30, 2021, which claims priority to Japanese Patent Application No. 2020-166696, filed Oct. 1, 2020, the entire contents of each of which are hereby incorporated by reference in their entirety.

TECHNICAL FIELD

The present invention relates to a structure of a stator assy of a brushless motor.

BACKGROUND

Japanese Patent Application Publication No. 2017-99255 (hereinafter "Patent Document 1") describes an inner-rotor single-shaft brushless motor.

The brushless motor described in Patent Document 1 includes a rotor, a stator, a holding plate, and a cover member. The holding plate is disposed at a first end portion of a shaft of the rotor, and the first end portion of the shaft of the rotor is in contact with the holding plate. The stator is disposed around an outer periphery of the rotor. The stator is fixed to the holding plate.

Moreover, the cover member has a cylindrical shape with a first end portion open, and is disposed to cover the stator and the rotor. The holding plate is fixed to the cover member to cover the opening of the cover member.

However, during operation, the structure described in Patent Document 1 causes loud noise due to vibrations caused by rotations of the rotor.

SUMMARY OF THE INVENTION

The exemplary embodiments of the present invention aim to provide a quiet brushless motor.

In an exemplary aspect, a stator assy is provided that includes a stator, a housing having a space where the stator is disposed, and an insulating resin disposed in the space. The insulating resin fixes the housing to the stator.

In this structure, the housing and the stator are fixed to each other with the insulating resin to form an integrated structure. Thus, excitation vibrations and structure resonance are reduced.

DETAILED DESCRIPTION OF EMBODIMENTS

First Exemplary Embodiment

A brushless motor, a stator assy, and a method for manufacturing the brushless motor and the stator assy according to a first exemplary embodiment will be described with reference to the drawings.

Figure 1:
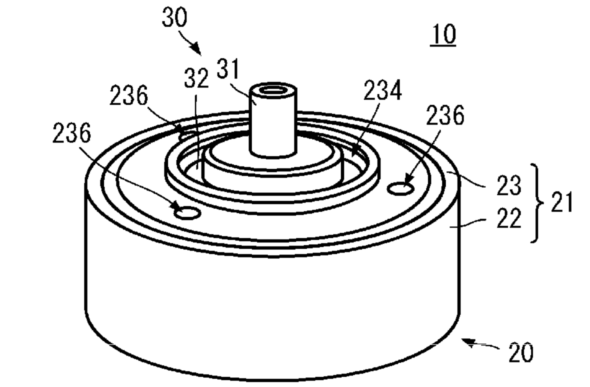
FIG. 1 is an external perspective view of a brushless motor 10 according to a first exemplary embodiment.
Figure 2:
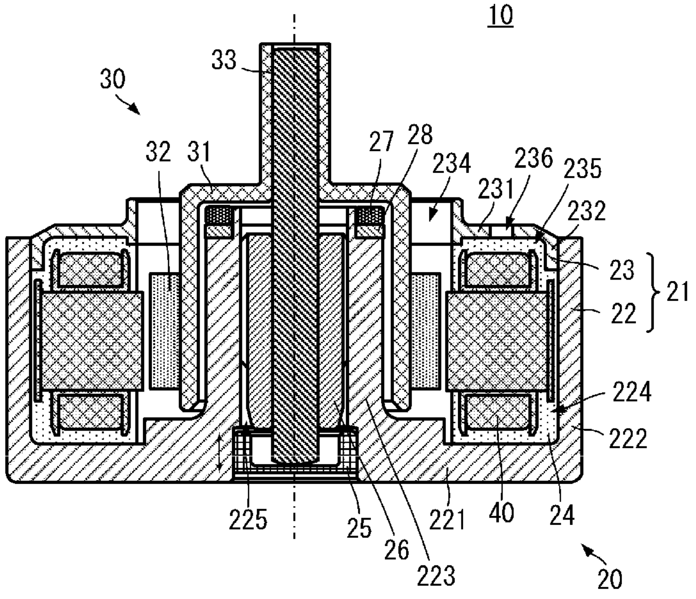
FIG. 2 is a sectional view, viewed from a side, of a structure of the brushless motor 10 according to the first exemplary embodiment.
Figure 3:
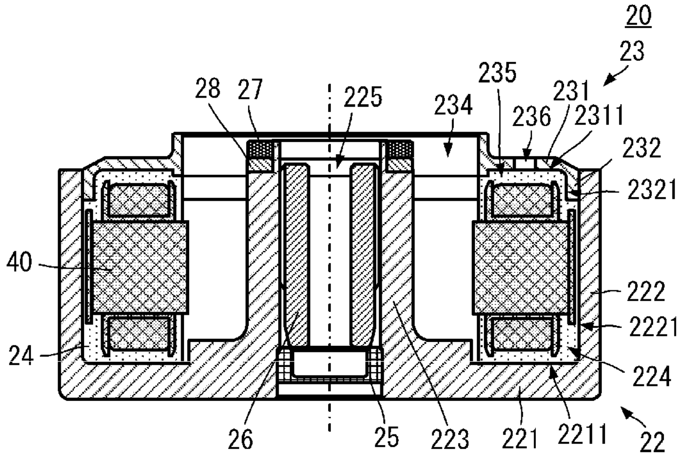
FIG. 3 is a sectional view, viewed from a side, of a structure of a stator assy 20 according to the first exemplary embodiment.

FIG. 1 is an external perspective view of a brushless motor 10 according to a first embodiment. FIG. 2 is a sectional view, viewed from a side, of a structure of the brushless motor 10 according to the embodiment. FIG. 3 is a sectional view, viewed from a side, of a structure of a stator assy 20 according to the embodiment.

(Schematic Structure of Brushless Motor 10)

As illustrated in FIG. 1 and FIG. 2, the brushless motor 10 includes a stator assy 20 and a rotor 30. The specific structures of the stator assy 20 will be described later.

As illustrated in FIG. 2, the rotor 30 includes a rotor yoke 31, a magnet 32, and a shaft 33. The specific description of the structure of the rotor 30 is omitted.

Figure 7:
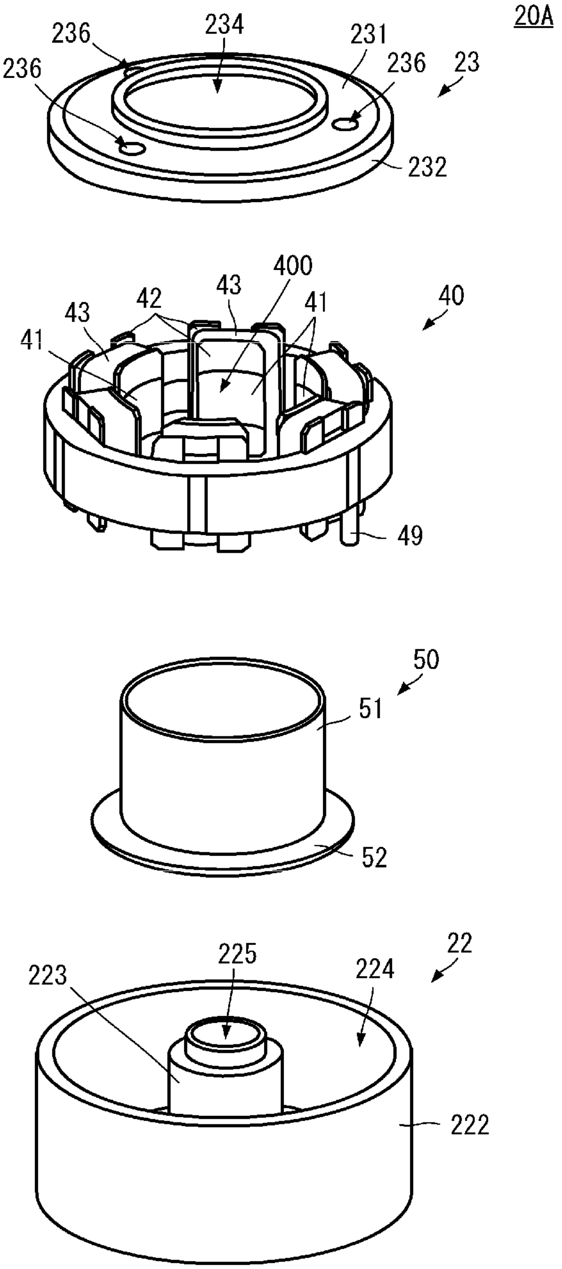
FIG. 7 is an exploded perspective view of the stator assy 20A according to the second exemplary embodiment.

As shown, the stator assy 20 has an opening 234. The rotor 30 is inserted into the stator assy 20 through the opening 234. When the brushless motor 10 (i.e., the stator assy 20) is viewed in a plan view, as illustrated in FIG. 7, the opening 234 overlaps a center space 400 of a stator 40. Thus, the rotor 30 is disposed on the inner side of the stator 40. In other words, the stator 40 is disposed around the outer periphery of the rotor 30.

A first end portion of the rotor 30 from which the shaft 33 extends protrudes outward from the opening 234 of the stator assy 20. A second end portion of the rotor 30 opposite to the end portion from which the shaft 33 extends is rotatably supported by the stator assy 20.

This structure is provide to control signals provided to the stator 40 to control rotations of the rotor 30. Thus, the brushless motor 10 is embodied as an inner-rotor-type single-shaft brushless motor.

(Specific Structure of Stator Assy 20)

As illustrated in FIG. 1, FIG. 2, and FIG. 3, the stator assy 20 includes a housing 21, an insulating resin 24, a shaft cap member 25, a bearing 26, an attraction magnet 27, a yoke 28, and a stator 40.

The housing 21 includes a first housing member 22 and a second housing member 23. In an exemplary aspect, the first housing member 22 and the second housing member 23 can be formed from a highly stiff material, such as SUS, for example.

The first housing member 22 includes a main wall 221, a side wall 222, and an inner wall 223. The main wall 221 is circular in a plan view. The side wall 222 is cylindrical, is disposed along the outer peripheral end portion of the main wall 221, and extends in a direction perpendicular to the main surface of the main wall 221.

The inner wall 223 is cylindrical, is disposed at the center of the main wall 221, and extends in a direction perpendicular to the main surface of the main wall 221. Moreover, the inner wall 223 includes a hollow portion 225 that is open at opposite sides of the cylinder. The main wall 231 has an opening in an area overlapping the hollow portion 225. Thus, the hollow portion 225 is continuous to the outside of the main wall 231 in the first housing member 22.

With the main wall 221, the side wall 222, and the inner wall 223 having the above structures, the first housing member 22 has a space 224 defined by the main wall 221, the side wall 222, and the inner wall 223. The space 224 is annular in a plan view, and open at the side opposite to the side where the main wall 221 is located.

The second housing member 23 includes a main wall 231 and a side wall 232. The main wall 231 is circular in a plan view. The side wall 232 is cylindrical in a plan view. The side wall 232 is cylindrical, is disposed along the outer peripheral end portion of the main wall 231, and extends in a direction perpendicular to the main surface of the main wall 231. Thus, the second housing member 23 has a space 235 defined by the main wall 231 and the side wall 232. The space 235 is circular in a plan view, and open at the side opposite to the side where the main wall 231 is located.

The main wall 231 has, at the center, the opening 234 that extends through the main wall 231 in a thickness direction. The opening 234 is continuous with the space 235. The opening 234 is circular in a plan view. In the exemplary aspect, the profile of the opening 234 is similar to the profile of the rotor 30 in a plan view (i.e., the profile viewed from the first end portion or the second end portion of the shaft 33). The opening 234 has an area configured to receive the rotor 30, for example, about the same as the plane area of the center space 400 of the stator 40.

The main wall 231 has multiple holes 236 that extend through the main wall 231 in the thickness direction, and are continuous with the space 235. The multiple holes 236 are disposed along the outer periphery of the opening 234.

The first housing member 22 and the second housing member 23 are assembled together. More specifically, the first housing member 22 is disposed to have the opening of the space 224 facing the second housing member 23, and the second housing member 23 is disposed to have the opening of the space 235 facing the first housing member 22. Thus, the second housing member 23 is fitted to the first housing member 22 while having the outer wall (i.e., a peripheral surface) of the side wall 232 coming into contact with an inner wall surface 2221 of the side wall 222 of the first housing member 22.

As such, the housing 21 has an internal space that is continuous with the outside of the second housing member 23 through the opening 234 and the multiple holes 236 described above.

The shaft cap member 25 is disk-shaped and has a recess set back from a first main surface. The shaft cap member 25 is disposed around an end portion of the hollow portion 225 near the main wall 221.

The bearing 26 is cylindrical, located in the hollow portion 225, and fixed to the wall (i.e., the peripheral surface) of the inner wall 223 facing the hollow portion 225.

Moreover, the attraction magnet 27 is annular. and is disposed at a far end portion of the inner wall 223, in other words, at an end portion of the inner wall 223 opposite to an end portion connected to the main wall 221.

The yoke 28 is annular and has a shape substantially the same as the shape of the attraction magnet 27. The yoke 28 is disposed near the far end portion of the inner wall 223, and on the side of the attraction magnet 27 closer to the main wall 221.

As illustrated in FIG. 7, the stator 40 includes multiple stator cores 41, insulators 42, and multiple coil conductors 43. The stator 40 is annular, and has a center space 400. The multiple stator cores 41 are arranged at intervals from each other in an annular circumferential direction. The multiple coil conductors 43 are wound around the multiple stator cores 41 with the insulators 42 interposed therebetween. More specifically, the multiple coil conductors 43 are wound around the stator cores 41 about the direction, serving as an axis, extending outward from the annular center of the stator 40.

According to an exemplary aspect, the profile of the stator 40 viewed in a plan view is substantially the same as the shape of the inner wall surface 2221 of the side wall 222 of the first housing member 22, and smaller than the inner wall surface 2221. The profile of the center space of the stator 40 when viewed in a plan, that is, the shape of the inner end portion of the stator 40 is substantially the same as the profile of the rotor 30, described later, and larger than the profile of the rotor 30.

The stator 40 is located in the internal space in the housing 21. More specifically, the stator 40 is accommodated in the space 224 in the first housing member 22 and the space 235 in the second housing member 23. In this case, in a plan view, the center of the stator 40 and the center of the internal space in the housing 21 are substantially aligned with each other. The outer peripheral end portion of the stator 40 is located closer to, but not in contact with the inner wall surface 2221 of the side wall 222 of the first housing member 22. The position of the stator 40 with respect to the first housing member 22 is fixed by, for example, bringing leg members in the stator 40 into contact with an inner surface of the main wall 221 of the first housing member 22.

The insulating resin 24 is annular, and disposed in the internal space in the housing 21. More specifically, the insulating resin 24 covers substantially throughout the stator 40 and is in contact with substantially the entirety of an inner wall surface 2211 of the main wall 221 of the first housing member 22 and substantially the entirety of the inner wall surface 2221 of the side wall 222. The insulating resin 24 is in contact with substantially the entirety of an inner wall surface 2311 of the main wall 231 of the second housing member 23 and substantially the entirety of an inner wall surface 2321 of the side wall 232. A cylindrical space disposed at the center of the insulating resin 24 has a shape and a size that can receive the rotor 30.

In this structure, the stator 40 and the housing 21 are fixed to each other with the insulating resin 24. In addition, the first housing member 22 and the second housing member 23 are fixed to each other with the insulating resin 24. Thus, a structure including the stator 40, the insulating resin 24, the first housing member 22, and the second housing member 23 is integrally formed. This structure is provided to reduce excitation vibrations and structure resonance caused in the stator assy 20 when the rotations of the rotor 30 are controlled.

Figure 4A:
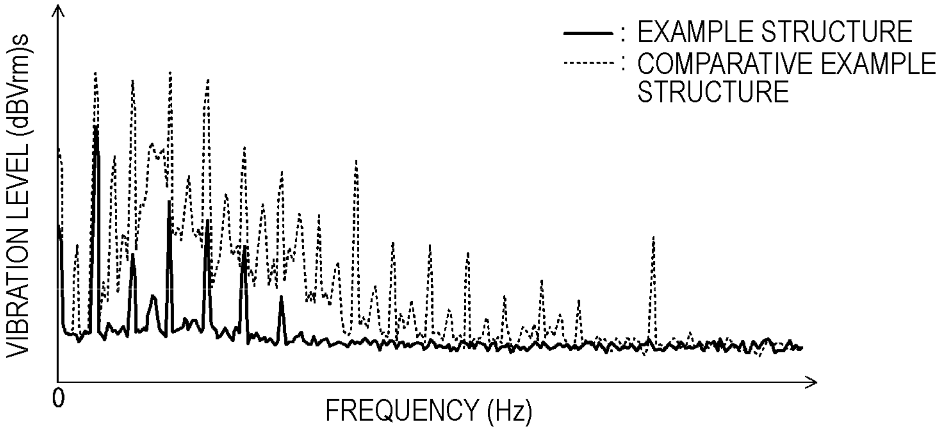
FIG. 4(A) is a graph of the frequency characteristic to the vibration level.

FIG. 4(A) is a graph of the frequency characteristic to the vibration level. The comparative structure in FIG. 4(A) is a structure where the housing 21 is not filled with the insulating resin 24 and the stator 40 is not integrated with the housing 21. As illustrated in FIG. 4(A), use of the structure according to the present embodiment lowers the vibration level over a wide frequency band.

Moreover, the first housing member 22 and the second housing member 23 are not fixed to each other with, for example, screws in the exemplary aspect. Thus, no misalignment is caused between the first housing member 22 and the second housing member 23 through screwing, and unwanted vibrations due to such misalignment are reduced. In addition, this structure does not require the first housing member 22 and the second housing member 23 to have portions to receive, for example, screws. This structure thus enables further size reduction of the housing 21 than the structure that uses screws while keeping the shape of the stator 40 unchanged.

The material of the insulating resin 24 has higher thermal conductivity than air. Thus, heat produced by the stator 40 is efficiently transferred to the housing 21 through the insulating resin 24. Thus, the configuration of the stator assy 20 improves the heat radiation efficiency. Particularly, in the present embodiment, the insulating resin 24 covering the stator 40 is in surface contact with the first housing member 22 and the second housing member 23. Thus, this structure further improves the efficiency of heat transfer to the first housing member 22 and the second housing member 23, that is, to the housing 21, and the stator assy 20 further improves the heat radiation efficiency. The insulating resin 24 is in contact with substantially the entirety of the inner wall surface 2211, substantially the entirety of the inner wall surface 2221, substantially the entirety of the inner wall surface 2311, and substantially the entirety of the inner wall surface 2321. Thus, the efficiency of heat transfer to the first housing member 22 and the second housing member 23, that is, to the housing 21 is improved further, and the stator assy 20 further improves the heat radiation efficiency.

Figure 4B:
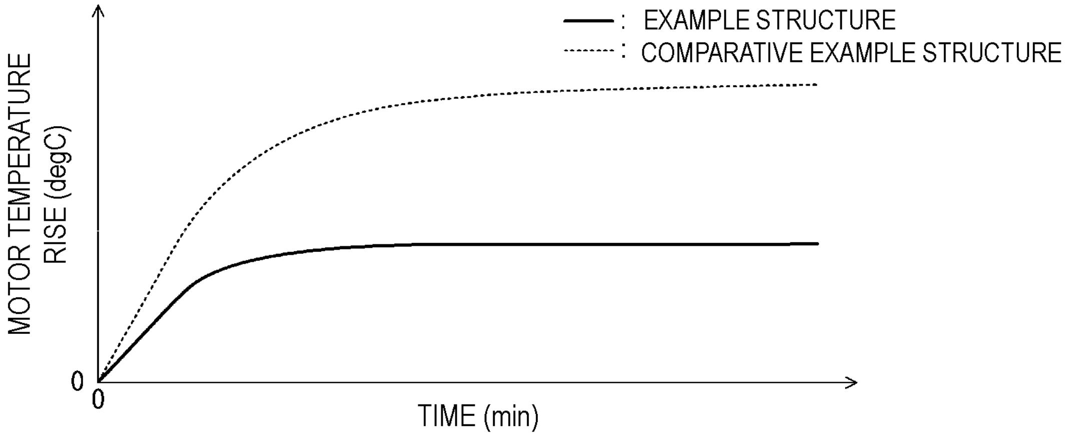
FIG. 4(B) is a graph of the time characteristics to the motor temperature rise.

FIG. 4(B) is a graph of the time characteristics to the motor temperature rise. The comparative structure in FIG. 4(B) is a structure where the housing 21 is not filled with the insulating resin 24. As illustrated in FIG. 4(B), the structure according to the present embodiment can reduce the temperature rise of the motor at transient time, and lower the temperature of the motor at the steady operation.

(Method for Manufacturing Stator Assy 20)

Figure 5:
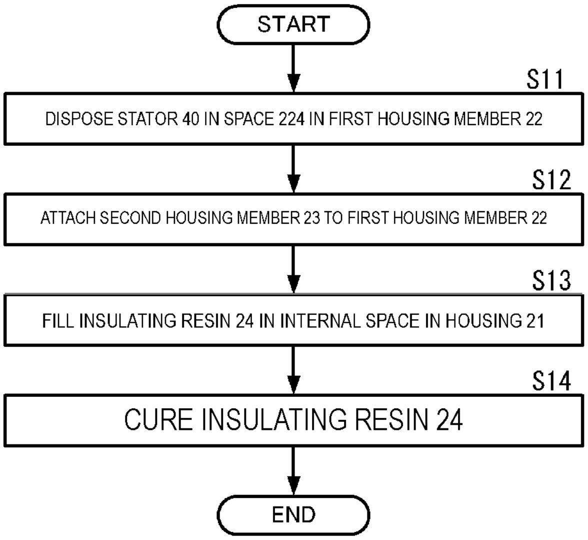
FIG. 5 is a flowchart of an example of a method for manufacturing a stator assy according to an exemplary embodiment.

The stator assy 20 with the above structure can be manufactured by, for example, the following method. FIG. 5 is a flowchart of an example of a method for manufacturing the stator assy 20 according to an exemplary embodiment.

As illustrated in FIG. 5, first, the stator 40 is disposed in the space 224 in the first housing member 22 (S11). Subsequently, the second housing member 23 is attached to the first housing member 22 (S12). More specifically, the second housing member 23 is attached to the first housing member 22 to connect the space 224 in the first housing member 22 (corresponding to "a first space" in the present disclosure) and the space 235 in the second housing member 23 (corresponding to "a second space" in the present disclosure) to each other.

Subsequently, the insulating resin 24 is filled in the internal space in the housing 21 (S13). More specifically, the insulating resin 24 is poured into and filled in the housing 21 through the multiple holes 236 formed in the second housing member 23. At this time, for example, a die set is inserted in an area where the rotor 30 is to be disposed. Thus, the insulating resin 24 does not enter the area where the rotor 30 is to be disposed. Subsequently, the insulating resin 24 is cured (S14). The inserted die set may be removed, for example, after the insulating resin 24 is cured.

The stator assy 20 can be easily manufactured by the above manufacturing method.

Second Exemplary Embodiment

A brushless motor, a stator assy, and a method for manufacturing the brushless motor and the stator assy according to a second exemplary embodiment will be described with reference to the drawings.

Figure 6:
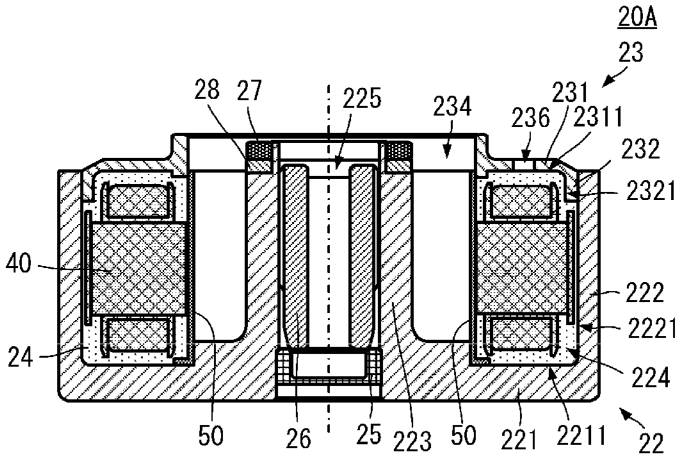
FIG. 6 is a sectional view, viewed from a side, of a structure of a stator assy 20A according to a second exemplary embodiment.

FIG. 6 is a sectional view, viewed from a side, of a structure of a stator assy 20A according to a second embodiment. FIG. 7 is an exploded perspective view of the stator assy 20A according to the second embodiment of the present invention. It is noted that FIG. 7 omits illustration of the insulating resin 24. In other words, FIG. 7 illustrates the state before the insulating resin 24 is filled and cured.

As illustrated in FIG. 6 and FIG. 7, the stator assy 20A of the brushless motor according to the second embodiment differs from the stator assy 20 according to the first embodiment in that it includes a filling supplemental member 50. Other components of the stator assy 20A are the same as those of the stator assy 20, and the same components will not be described.

The stator assy 20A includes a filling supplemental member 50. The filling supplemental member 50 is cylindrical, and is formed from a non-magnetic insulating resin. The filling supplemental member 50 corresponds to "a supplemental member" according to the present disclosure.

The filling supplemental member 50 includes a cylindrical body portion 51, and an annular bottom portion 52. For example, the body portion 51 and the bottom portion 52 are integrally formed. The bottom portion 52 is disposed at a first end portion of the body portion 51 in the axial direction of the cylinder.

The filling supplemental member 50 is disposed to have the circumferential surface of the body portion 51 located close to and along the inner peripheral end portion of the stator 40. The bottom portion 52 is in contact with the main wall 221 of the first housing member 22, and an end portion of the body portion 51 opposite to the end portion where the bottom portion 52 is located is in contact with the main wall 231 of the second housing member 23. Thus, the stator 40 is disposed in the space defined by the filling supplemental member 50, the main wall 221 and the side wall 222 of the first housing member 22, and the main wall 231 of the second housing member 23.

The insulating resin 24 is filled in the space defined by the filling supplemental member 50, the main wall 221 and the side wall 222 of the first housing member 22, and the main wall 231 of the second housing member 23.

As illustrated in FIG. 7, the filling supplemental member 50 includes an annular fastening portion at the bottom portion. The fastening portion is fixed to the main wall 221 of the first housing member 22 with, for example, an adhesive. This structure is configured to prevent the movement of the filling supplemental member 50 when the insulating resin 24 is filled. Thus, the insulating resin 24 can be filled in an intended space.

Moreover, this structure allows the insulating resin 24 to be more reliably filled in an intended space without using, for example, a die set described in the first embodiment. In addition, this structure allows the rotor 30 to be inserted into the stator assy 20 before the insulating resin 24 is cured, and thus can be manufactured in a shorter time.

Figure 8:
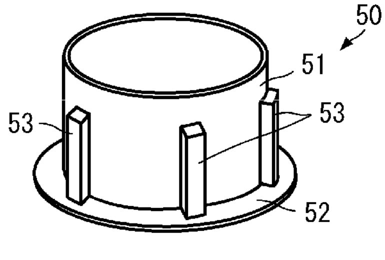
FIG. 8 is a perspective view of a filling supplemental member with another shape.

FIG. 8 is a perspective view of the filling supplemental member 50 with another shape. The filling supplemental member 50 illustrated in FIG. 8 differs from the filling supplemental member 50 illustrated in FIG. 7 in that it has multiple protrusions 53 disposed at intervals along the circumferential surface of the body portion 51.

The structure including the multiple protrusions 53 can receive the stator 40 to hold the multiple protrusions 53 between the stator cores 41 of the stator 40. Thus, for example, the amount of the insulating resin 24 can be reduced.

In the illustrated structure of each of the above embodiments, the insulating resin 24 is filled in the entire space surrounding the stator 40. However, as long as the stator 40 has at least its bottom portion embedded in the insulating resin 24 with a predetermined depth, the structure has above effects. This structure indicates the state where "the housing and the stator are fixed to each other" in the present disclosure. In other words, the state where the housing and the stator are joined or bonded to be regarded as an integrated unit against vibrations indicates the state where "the housing and the stator are fixed to each other" in the present disclosure. It is noted that the definition of this "fixing" is also applicable to joining or bonding between the first housing member 22 and the second housing member 23.

For example, the above effects can be more effectively obtained as long as the insulating resin 24 is filled in about 70% or more of the space surrounding the stator 40.

REFERENCE SIGNS LIST

10 brushless motor
20, 20A stator assy
21 housing
22 first housing member
23 second housing member
24 insulating resin
25 shaft cap member
26 bearing
27 attraction magnet
28 yoke
30 rotor
31 rotor yoke
32 magnet
33 shaft
40 stator
41 multiple stator cores
42 insulator
43 coil conductor
50 filling supplemental member

The invention claimed is:

1. A stator assy, comprising:
a housing having a space;
a stator disposed in the space of the housing;
an insulating resin disposed in the space and that fixes the housing to the stator; and
a supplemental member disposed along an inner peripheral end of the stator to surround the stator and the insulating resin together with the housing,
wherein the supplemental member includes a cylindrical body portion, an annular bottom portion, and a plurality of protrusions on a circumferential surface of the body portion.

2. The stator assy according to claim 1, wherein the housing includes a first housing member and a second housing member that define the space on an inner side, and the insulating resin fixes the first housing member, the second housing member, and the stator to each other.

3. The stator assy according to claim 2, wherein the insulating resin is in surface contact with an inner wall surface of the first housing member and an inner wall surface of the second housing member.

4. The stator assy according to claim 2, wherein the first housing member includes a main wall, a side wall, and an inner wall.

5. The stator assy according to claim 1, wherein the insulating resin has higher thermal conductivity than air.

6. A brushless motor, comprising:
the stator assy according to claim 1; and
a rotor disposed on an inner side of the stator.

7. A stator assy comprising:
a shaft having a rotor yoke extending therefrom;
a housing including a first housing member and a second housing member that define a space on an inner side thereof;
a stator disposed in the space of the housing;
a magnet on an outer surface of the rotor yoke to face the stator; and
an insulating resin disposed in the space and that fixes the first housing member, the second housing member, and the stator to each other,
wherein the first housing member includes a main wall, a side wall, and an inner wall,
wherein the main wall is circular in a plan view, and
wherein the side wall is cylindrical in the plan view, is disposed along an outer peripheral end of the main wall, and extends in a direction perpendicular to a main surface of the main wall.

8. The stator assy according to claim 7, wherein the inner wall is cylindrical in the plan view, is disposed at a center of the main wall, and extends in a direction perpendicular to the main surface of the main wall.

9. The stator assy according to claim 8, wherein the inner wall includes a hollow portion and the main wall has an opening in an area overlapping the hollow portion.

10. The stator assy according to claim 9, wherein the second housing member includes a main wall and a side wall.

11. The stator assy according to claim 10,
wherein the main wall of the second housing member is circular in the plan view, and
wherein the side wall of the second housing member is cylindrical in the plan view, is disposed along an outer peripheral end of the main wall, and extends in a direction perpendicular to a main surface of the main wall of the second housing member.

12. The stator assy according to claim 11, wherein the main wall of the second housing member has, at a center, an opening that extends through the main wall in a thickness direction.

13. A stator assy, comprising:
a housing that includes a first housing member and a second housing member that define a space therein;
a stator disposed in the space of the housing;
an insulating resin that fixes the stator to the housing to reduce excitation vibrations and structure resonance caused in the stator assy in response to rotations of a rotor coupled thereto; and
a supplemental member disposed along an inner peripheral end of the stator to surround the stator and the insulating resin together with the housing,
wherein the supplemental member includes a cylindrical body portion, an annular bottom portion, and a plurality of protrusions on a circumferential surface of the body portion.

14. The stator assy according to claim 13, wherein the insulating resin is in surface contact with an inner wall surface of the first housing member and an inner wall surface of the second housing member.

15. The stator assy according to claim 13, wherein the insulating resin has higher thermal conductivity than air.

* * * * *